United States Patent

Shah

[11] Patent Number: 5,987,603
[45] Date of Patent: Nov. 16, 1999

[54] APPARATUS AND METHOD FOR REVERSING BITS USING A SHIFTER

[75] Inventor: Shailesh I. Shah, Sunnyvale, Calif.

[73] Assignee: LSI Logic Corporation, Milpitas, Calif.

[21] Appl. No.: 08/845,817

[22] Filed: Apr. 29, 1997

[51] Int. Cl.[6] .................................................... G06F 7/00
[52] U.S. Cl. ........................ 712/300; 712/223; 708/209
[58] Field of Search ...................... 364/715.08; 395/564, 395/898, 890, 309, 310; 708/209; 712/223, 898, 70, 129, 130

[56] References Cited

U.S. PATENT DOCUMENTS

| Re. 33,664 | 8/1991 | Kang et al. | 395/898 |
| 4,122,534 | 10/1978 | Cesaratto . | |
| 5,262,971 | 11/1993 | Yamaguchi | 364/715.08 |
| 5,682,340 | 10/1997 | Arends et al. | 364/715.08 |

FOREIGN PATENT DOCUMENTS

| 0 233 635 | 8/1987 | European Pat. Off. . |
| 0 264 130 | 4/1988 | European Pat. Off. . |
| 0 306 269 | 3/1989 | European Pat. Off. . |

OTHER PUBLICATIONS

Neil H.E. Weste et al., "Principles of CMOS VLSI Design A Systems Perspective", Second Edition, Addison–Wesley Publishing Company 1993, pp. 560–563.

Primary Examiner—Richard L. Ellis
Attorney, Agent, or Firm—Skjerven, Morrill MacPherson, Franklin & Friel; Omkar K. Suryadevara; Glen B. Choi

[57] ABSTRACT

An instruction (also called a "bit reversal instruction") for reversing the order of bits in an input signal is implemented by reusing one or more components in a datapath normally found in a processor. Specifically, a bit reversal instruction is implemented by reuse of a shifter unit normally used in a datapath to shift bits of an input signal. The shifter unit includes three stages: a first stage formed by a number of input multiplexers, a second stage formed by, for example, a left shifter, and a third stage formed by a number of output multiplexers. When using a left shifter to implement the bit reversal instruction, the input multiplexers are not used. Instead, the left shifter is used to shift bits of the input signal left by a number that is inverse of the number of bits to be reversed. Thereafter, the output multiplexers reverse the order of bits generated by the left shifter, thereby completing the bit reversal instruction. The shifter unit also implements a shift left instruction and a shift right instruction in the normal manner. Instead of using a left shifter, a right shifter can be used to implement the bit reversal instruction, wherein input multiplexers are used to reverse the order of bits, and output multiplexers are not used.

8 Claims, 5 Drawing Sheets

APPARATUS AND METHOD FOR REVERSING BITS USING A SHIFTER

FIELD OF THE INVENTION

This invention relates to the implementation of an instruction for reversing the order of bits of a signal in a processor, such as a digital signal processor or a microprocessor.

1. Cross Reference to Appendix A

Appendix A, which is a part of the present disclosure, is an appendix consisting of 4 sheets. Appendix A is a listing of computer programs and related data for one embodiment of the invention which is described more completely below. The computer programs and data can be compiled using a VERILOG-XL version 2.3.3 compiler available from Cadence Design Systems, Inc., 555 River Oaks Parkway, San Jose.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

2. Background

An instruction (hereinafter "bit reversal instruction") to reverse the order of bits of a signal (also called "input signal") can be implemented by a combination of multiplexers, e.g. multiplexers 20A, ... 20I, ... 20N (FIG. 1), where $A \leq I \leq N$, and N is the total number of bits in the input signal. Each one of multiplexers 20A–20N receives all N bits in the input signal from a bus (hereinafter "data input bus") 10. In response to a signal on a respective one of control buses 31A–30N, each one of multiplexers 21A–20N passes one of the bits in the input signal to a respective one of output lines 21A–21N.

Control buses 30A–30N carry signals generated by a decoder (hereinafter "count decoder") 31 that decodes a signal COUNT (also called "count signal") from a bus (hereinafter "count bus") 35. The count signal indicates the number of bits in the input signal that are to be reversed. The signal on each control bus 30I indicates to a corresponding multiplexer 20I that a specific line, e.g. line 10J of data input bus 10 is to be coupled to the multiplexer's output line, e.g. line 21I of multiplexer 20I. Output lines 21A–21N of multiplexers 21A–20N are connected to lines 40A–40N that form a data output bus 40. Therefore, data output bus 40 carries an output signal having a COUNT number of low order bits arranged in an order reversed with respect to the corresponding low order bits in the input signal. If N=16, the above-described arrangement requires a total of sixteen 16:1 multiplexers dedicated to implementing the bit reversal instruction.

SUMMARY

In accordance with the invention, an instruction (also called "bit reversal instruction") for reversing the order of bits of an input signal is implemented by reusing one or more devices in a datapath that is normally included in a processor, such as a digital signal processor or a microprocessor. A processor's datapath typically performs arithmetic and/or logic operations on an input signal and includes, for example, an arithmetic logic unit and a shifter unit. In one embodiment, an apparatus implements a bit reversal instruction (of the type described above) by reuse of a shifter unit that normally shifts a specified number of bits of an input signal either left (in response to a shift left instruction), or right (in response to a shift right instruction).

The apparatus (also called "bit manipulation apparatus") includes, in addition to the shifter unit, a number of multiplexers (also called "count multiplexers"), and a number of inverters. The inverters are coupled between the count multiplexers and a bus (also called "count bus") that carries a signal (also called "count signal") indicative of the number of bits (also called "count number") to be reversed. The count multiplexers pass to the shifter unit an inverse of the count signal for implementing the bit reversal instruction, or alternatively pass the count signal for implementing a shift instruction.

An inverse of the count signal is used to implement a bit reversal instruction because the shifter unit reverses all bits, e.g. after left shifting the bits. Specifically, in one embodiment, the shifter unit includes a left shifter, and the shifter unit implements the bit reversal instruction by shifting bits in the input signal left by an inverse of the count number, and thereafter reversing the order of the left shifted bits.

The shifter unit also implements shift instructions in the normal manner. Specifically, the shifter unit uses the left shifter to shift the input signal's bits left by the count number, thereby to complete a shift left instruction. The shifter unit implements a right shift instruction by reversing the order of all bits of the input signal, then shifting the reversed bits left by the count number, and finally reversing the order of the left shifted bits.

In this embodiment, the shifter unit includes three stages: a first stage that includes a number of input multiplexers, a second stage that includes a left shifter, and a third stage that includes a number of output multiplexers. The three stages are normally used in the datapath to shift bits in either a left direction, or a right direction. To implement the bit reversal instruction, the input multiplexers are not used. Instead, as noted above, the left shifter is used to shift bits of the input signal left by a number inverse of the count number. Thereafter, the output multiplexers reverse the order of bits generated by the left shifter, thereby completing the bit reversal instruction.

In another embodiment, instead of the shifter unit having a left shifter, the shifter unit has a right shifter. In this embodiment, the output multiplexers are not used to implement the bit reversal instruction. Instead, the input multiplexers reverse the order of bits supplied to the right shifter. Thereafter, the right shifter uses a number that is inverse of the count number to shift the reversed bits to the right. In this embodiment as well, the shifter unit implements shift instructions in the normal manner.

Therefore, by use of a small amount of additional hardware (e.g. a few multiplexers, a few inverters, and a logic gate), a bit reversal instruction is implemented by reusing devices normally included in a datapath (e.g. a left shifter and output multiplexers; or a right shifter and input multiplexers). Such reuse of datapath devices eliminates the conventional hardware otherwise dedicated to implementing a bit reversal instruction, and therefore saves area in an integrated circuit die. Moreover, elimination of the conventional dedicated hardware also reduces the power consumed by such an integrated circuit die.

DETAILED DESCRIPTION

Figure 1:
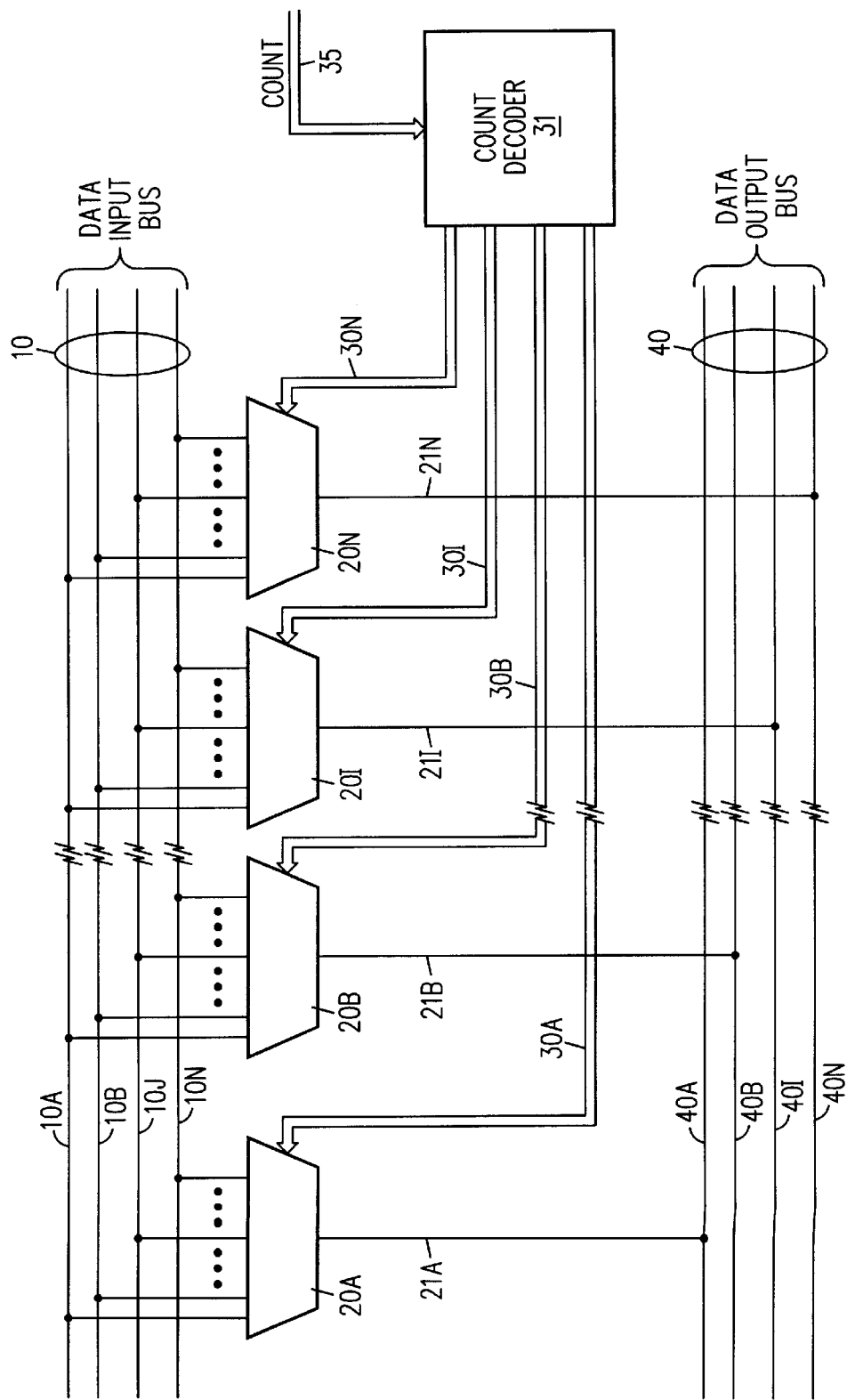
FIG. 1 illustrates, in a low level block diagram, implementation of a bit reversal instruction according to the prior art.
Figure 2:
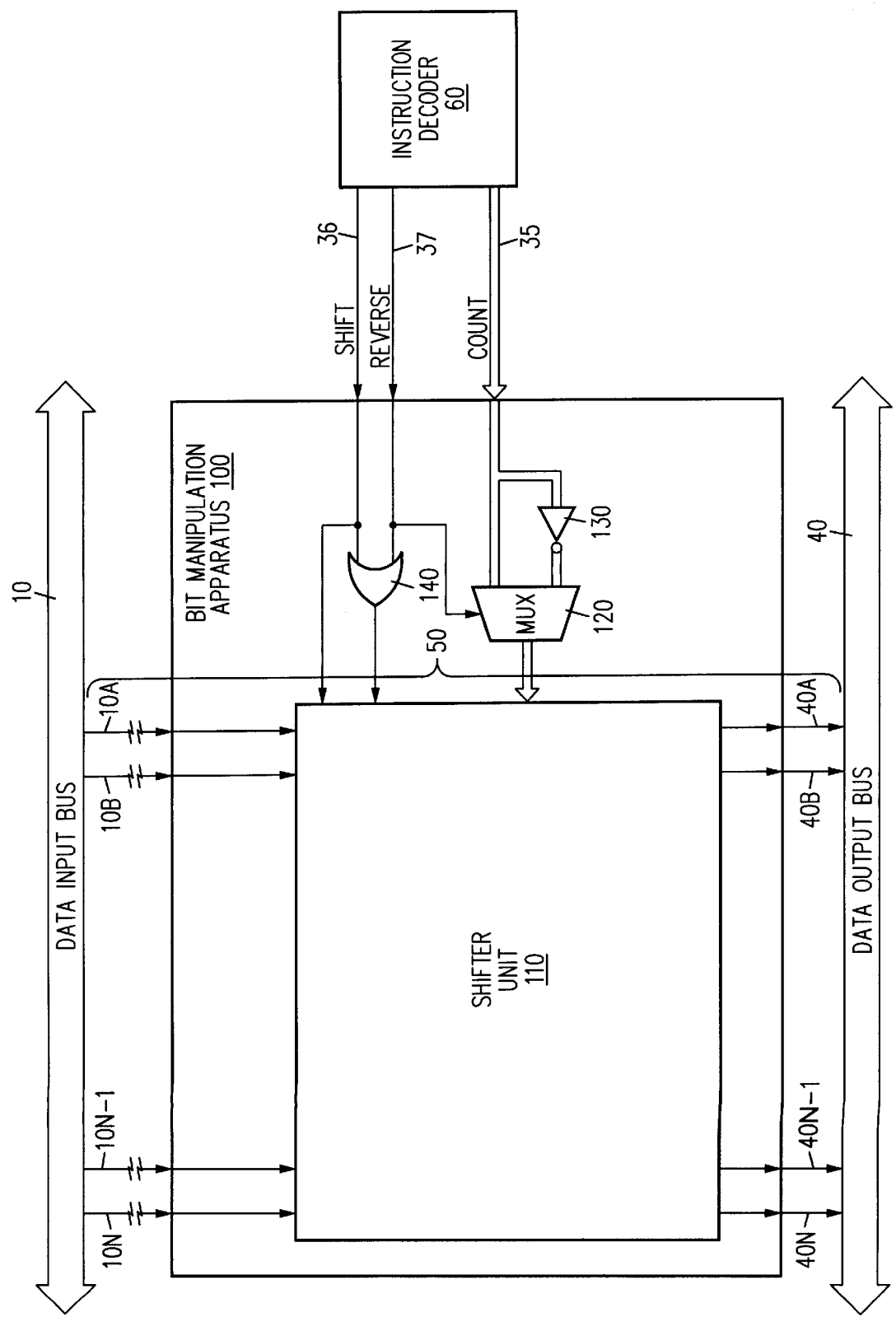
FIG. 2 illustrates, in a high level block diagram, implementation of a bit reversal instruction by reusing a component of a data path, specifically a shifter unit.

According to the principles of this invention, an instruction (also called "bit reversal instruction") for reversing the order of bits in a signal (also called "input signal") is implemented by reusing one or more devices of a processor's datapath 50 (FIG. 2). Datapath 50 is coupled between data input bus 10 and data output bus 40, and is normally used to perform arithmetic and/or logic operations on the input signal.

Specifically, in one embodiment, an apparatus (also called "bit manipulation apparatus") 100 is coupled to the following: (1) a data input bus 10 that carries an input signal to be processed, (2) a data output bus 40 that carries an output signal generated by apparatus 100, (3) a count bus 35 that carries a count signal indicating the number of bits in the input signal to be manipulated, and (4) instruction lines 36 and 37 that carry signals indicative respectively of a shift instruction or a reverse instruction is to be implemented on bits of the input signal.

In response to a signal REVERSE (also called "reverse signal") being active (e.g. high) on an instruction line (also called "first instruction line") 37, bit manipulation apparatus 100 reverses the order of bits of the input signal, and supplies an output signal containing the reversed bits to data output bus 40. The number of bits that are reversed is determined by a signal COUNT (also called "count signal") received on a count bus 35. Therefore, bits in the COUNT number of least significant locations of the output signal are arranged in a reverse order, as compared to bits in the corresponding COUNT number of least significant locations in the input signal. The remaining locations in the output signal have the bit 0 in this embodiment. Depending on the embodiment, count bus 35 can have P or fewer lines, where P=$\log_2$N.

Bit manipulation apparatus 100 reuses a shifter unit 110 that is normally included in datapath 50 and normally used to implement the two shift instructions, namely a shift left instruction, and a shift right instruction. To use shifter unit 110 in performing the bit reversal instruction, bit manipulation apparatus 100 includes a number of multiplexers (also called "count multiplexers") 120 that supply to shifter unit 110 either a count signal from count bus 35 or an inverse of the count signal, depending on whether signal REVERSE is inactive or active respectively. Bit manipulation apparatus 100 also includes a number (equal to the number of multiplexers) of inverters 130 that are coupled between multiplexers 120 and count bus 35 thereby to invert the count signal for supply to multiplexers 120. Each of inverters 130 receives a signal from a line of count bus 35 and supplies an inverted signal to one of multiplexers 120.

When a bit reversal instruction is to be implemented, signal REVERSE goes active and multiplexer 120 passes an inverse of the count signal to shifter unit 110. However, when a shift instruction is to be implemented, signal REVERSE on first instruction line 37 goes inactive, and multiplexer 120 passes the signal COUNT from count bus 35 directly to shifter unit 110. Shifter unit 110 also receives another signal (also called "shift signal") from an instruction line (also called "second instruction line") 36, that indicates to shifter unit 110 the type of shift instruction to be implemented.

Note that bit manipulation apparatus 100 also includes a logic gate 140, e.g. an OR gate, that is coupled to receive signals from each of the two instruction lines 36 and 37. Logic gate 140 logically ORs the reverse signal and the shift signal to generate a signal (hereinafter "ORed signal") that is supplied to shifter unit 110. The ORed signal goes active when either one of instruction lines 36 and 37 carries an active signal.

Therefore, in one example (also called "bit reversal example"), if data input bus 10 (FIG. 2) carries the input signal 1011 0100 0111 0010 on the respective lines 10A–10N (where A≦I≦N, for example A=1 and N=16), and the count signal on bus 35 has the value 6, i.e. bits 0110, then bit manipulation apparatus 100 supplies on lines 40A–40N of data output bus 40 the signal 0000 0000 0001 0011 when signal REVERSE is active on line 37 (FIG. 2). Hence, the 6 low order bits of the output signal, i.e. bits 01 0011 are reversed as compared to the 6 low order bits of the input signal, i.e. bits 11 0010.

In another example (also called "shift left example"), signal REVERSE is inactive on line 37, and instead a signal SHIFT is active on line 36 e.g. to indicate that a left shift instruction is to be executed. In response to the active signal SHIFT, bit manipulation apparatus 100 supplies on lines 40A–40N the signal 0001 1100 1000 0000 wherein all the bits have been shifted left by six positions, and the 6 low order bits are set to zero (assuming the same input signal and the same count signal as the bit reversal example).

A shifter unit 110 having any design can be used in the bit manipulation apparatus 100 described above. In one variant of the above-described embodiment, shifter unit 110 (FIG. 3A) includes the following three stages. A first stage includes a number of input multiplexers 210A–210N (where N is the number of input multiplexers). A second stage includes a left shifter 220 having a number of input terminals 221A–221N coupled to input multiplexers 210A–210N. A third stage includes a number of output multiplexers 230A–230N that are coupled to output lines 222A–222N of left shifter 220.

Each input multiplexer 210I has two data terminals 211I and 212I (also referred to as "third data terminal" and "fourth data terminal"), a control terminal (also referred to as "input control terminal") 214I and a line (also referred to as "data input line") 213I. Each of the data input lines, e.g. lines 213A–213N of input multiplexers 210A–210N are coupled to the respective input terminals 221A–221N of left shifter 220. Moreover, each of control terminals 214A–214N is coupled to a single instruction line (also called "second instruction line") 36.

Each multiplexer 210I has one data terminal 211I connected directly to data input bus 10, e.g. data terminal 211A is coupled to a line (not labeled in FIG. 3A) in data bus 10 carrying a signal of the least significant bit of the input signal. The other data terminal 212I of multiplexer 210I is coupled to a data terminal 211J in an order reverse of the order of coupling of data terminals 211A–211N. For example, the following pairs of data terminals are coupled to each other (212A, 211N), (212N, 211A), (212B, 211N-1), and (212N-1, 211B). In general, if each third data terminal and each fourth data terminal is identified by a number i where $0 \leq i \leq n$, then each fourth data terminal i is coupled to a third data terminal n-i.

In response to an active signal on second instruction line 36, input multiplexers 210A–210N pass a reversed input signal to left shifter 220. Specifically, in response to an active signal at control terminals 214A–214N, multiplexers 210A–210N couple the respective lines 213A–213N to fourth data terminals 212A–212N. For example, if the input signal is 0110 0001 1100 0101, then input multiplexers 210A–210N pass the reversed signal 1010 0011 1000 0110 to left shifter 220 in response to an active signal on line 36. If the signal on second instruction line 36 is inactive, input multiplexers 210A–210N couple lines 213A–213N directly to third data terminals 211A–211N, and the input signal is passed without any change to left shifter 220.

Left shifter 220 can be implemented by use of any conventional design, such as the shifters described in pages 560–563 of the book "PRINCIPLES OF CMOS VLSI DESIGN, A Systems Perspective", by Neil H. E. Weste and Kamaran Eshraghian, Addison-Wesley Publishing Company, Second Edition 1993 that is incorporated by reference herein in its entirety. In the embodiment illustrated in FIG. 3A, left shifter 220 shifts a signal received from input multiplexers 210A–210N left by the number of bits indicated by the count signal from multiplexers 120. For example, if the signal from input multiplexers 210A–210N is 0110 0001 1100 0101, and the count signal from multiplexers 120 has the bits 0011 (i.e. 3 in decoded form), then left shifter 220 generates the signal 0000 1110 0010 1000.

Each of output multiplexers 230A–230N, e.g. multiplexer 230I has an output control terminal, e.g. terminal 234I that is connected to logic gate 140. Moreover, output multiplexers 230A–230N also have data terminals that are coupled in a manner similar to the data terminals of input multiplexers 210A–210N as described above. Specifically, output multiplexers 230A–230N have a number of first data terminals 231A–231N that are directly coupled to lines 222A–222N of left shifter 220. Output multiplexers 230A–230N further have a number of second data terminals 232A–232N that are coupled in the reverse order of first data terminals 231A–231N.

For example, second data terminal 232A of output multiplexer 230A is coupled to output multiplexer 230N's first data terminal 231N (that, as noted above, is coupled to line 222N). Second data terminal 232B of output multiplexer 230B is coupled to output multiplexer 230N-1's first data terminal 231N-1 that is coupled to line 222N-1 of left shifter 220. Therefore, in general, if each first data terminal and each second data terminal is identified by a number i, where $0 \leq i \leq n$, then each second data terminal i is coupled to a first data terminal n-i.

Output multiplexers 230A–230N reverse the signals on lines 222A–222N from shifter 220 in response to an active signal on respective output control terminals 234A–234N that receive the active signal (as the ORed signal described above) from either one of instruction lines 36 and 37 through logic gate 140. That is, output multiplexers 230A–230N reverse the signal from left shifter 220 during implementation of a bit reversal instruction as indicated by the ORed signal generated by logic gate 140 in response to an active reverse signal on first instruction line 37. Output multiplexers 230A–230N also reverse the signal from left shifter 220 during a shift right instruction as indicated by an active shift signal on second instruction line 36.

In the above-described bit reversal example, signal REVERSE on line 37 is active, and the signal SHIFT RIGHT on line 36 is inactive. Therefore, input multiplexers 210A–210N pass the input signal 1011 0100 0111 0010 to lines 213A–231N (see FIG. 3B) without any change (as shown by arrows AA–AN). That is, left shifter 220 receives on input terminals 221A–221N (FIG. 3A) the signal 1011 0100 0111 0010.

Left shifter 220 shifts the signal on terminals 221A–221N by an inverse of the signal COUNT, e.g. by count signal 1001, i.e. 9 in decoded form (which is 1's complement of original count 6). Therefore, left shifter 220 drives on lines 222A–222N (FIG. 3B) the signal 1100 1000 0000 0000 that is left shifted by 9 positions (as shown by arrows BA–BC, wherein A=1 and C=6).

Thereafter, output multiplexers 230A–230N (FIG. 3A) reverse the signal from left shifter 220 in response to the active ORed signal provided by logic gate 140. All bits from left shifter 220 are reversed (as shown by arrows CA–CN in FIG. 3B) thereby to supply on lines 233A–233N the signal 0000 0000 0001 0011. Therefore, the output signal's six low order bits 301 (FIG. 3B), i.e. bits 01 0011 are reversed from the corresponding six low order bits 302 of the input signal, i.e. bits 11 0010.

Note that left shifter 220 uses an inverse of the signal COUNT (as described above) because output multiplexers 230A–230N reverse all bits provided by left shifter 220, and left shifter 220 shifts bits in the input signal prior to the reversing of bits by output multiplexers 230A–230N.

In this embodiment, bit manipulation apparatus 100 (FIG. 3A) can also be used in the normal manner, e.g. to shift bits left by use of left shifter 220, while multiplexers 210A–210N and 230A–230N are held inactive, thereby to pass the signal directly through from data input bus 10 to terminals 221A–221N, and from lines 222A–222N directly to data output bus 20. Therefore, in the above-described left shift example, signal SHIFT RIGHT on line 36 is inactive, and the signal REVERSE on line 37 is also inactive so that multiplexers 210A–210N and 230A–230N are held inactive. Moreover, as signal REVERSE is inactive, multiplexer 120 passes the count signal from bus 35 directly to left shifter 220, and left shifter 220 shifts the input signal from data bus 10 left by the number of bits indicated by the count signal, as described above.

Use of a small amount of additional hardware, e.g. multiplexers 120, inverters 130 and logic gate 140, and a device in data path 50 (e.g. shifter unit 110) eliminates the conventional dedicated hardware otherwise required to implement a bit reversal instruction. That is, shifter unit 110 that is normally required in a data path is reused according to the invention to perform a bit reversal instruction. Such reuse of a data path device therefore saves area in an integrated circuit die, and also reduces the power consumed by such an integrated circuit die.

Numerous modifications and adaptations of the above-described embodiment will be apparent to a person skilled in the design of processors, in view of the disclosure. For example, instead of using a left shifter 220, a right shifter 240 (FIG. 4) can be used. For convenience, identical reference numerals are used in both FIGS. 3A and 4 to identify similar or identical parts. Therefore, when using a right shifter 240, logic gate 140 drives a signal to input multiplexers 210A–210N if either a signal REVERSE or a signal SHIFT LEFT (also called a "left shift signal") is active. When signal REVERSE is active, input multiplexers 210A–210N reverse the order of bits in the input signal (from data input bus 10) and supply the reversed signal to right shifter 240. Output multiplexers 230A–230N are not used when reversing bits using right shifter 240. Note that here as well, the signal SHIFT LEFT is driven active by, e.g. an instruction decoder 40 to indicate that a left shift instruction is to be performed on the input signal.

Depending on the embodiment, bit manipulation apparatus 100 is implemented in any processor, such as a microprocessor or a digital signal processor, as a portion of an integrated circuit (IC).

Also, multiplexer 120 can be implemented either as pass gate (also called "transmission gate") logic or as discrete logic gates depending on the embodiment. Note that instead of multiplexers 120 and inverters 130 (FIG. 3A), custom designed logic can be used to implement the above-described function to generate a control signal (for left shifter 220) from a decoded count signal received on a count bus having N lines.

Moreover, although a three stage embodiment is described above in reference to FIG. 3A, bit manipulation apparatus 100 can be implemented in any number of stages, such as two stages or four stages.

Furthermore, although in one embodiment, bit manipulation apparatus 100 (FIG. 3A) supplies a bit reversed signal to data output bus 40 within one clock cycle of receiving an input signal on data input bus 10, other embodiments can take more than one cycle (e.g. by using flip flops to latch the signal between any two stages).

Numerous such modifications and adaptations of the above-described embodiments are encompassed by the attached claims.

APPENDIX A

Figure 3A:
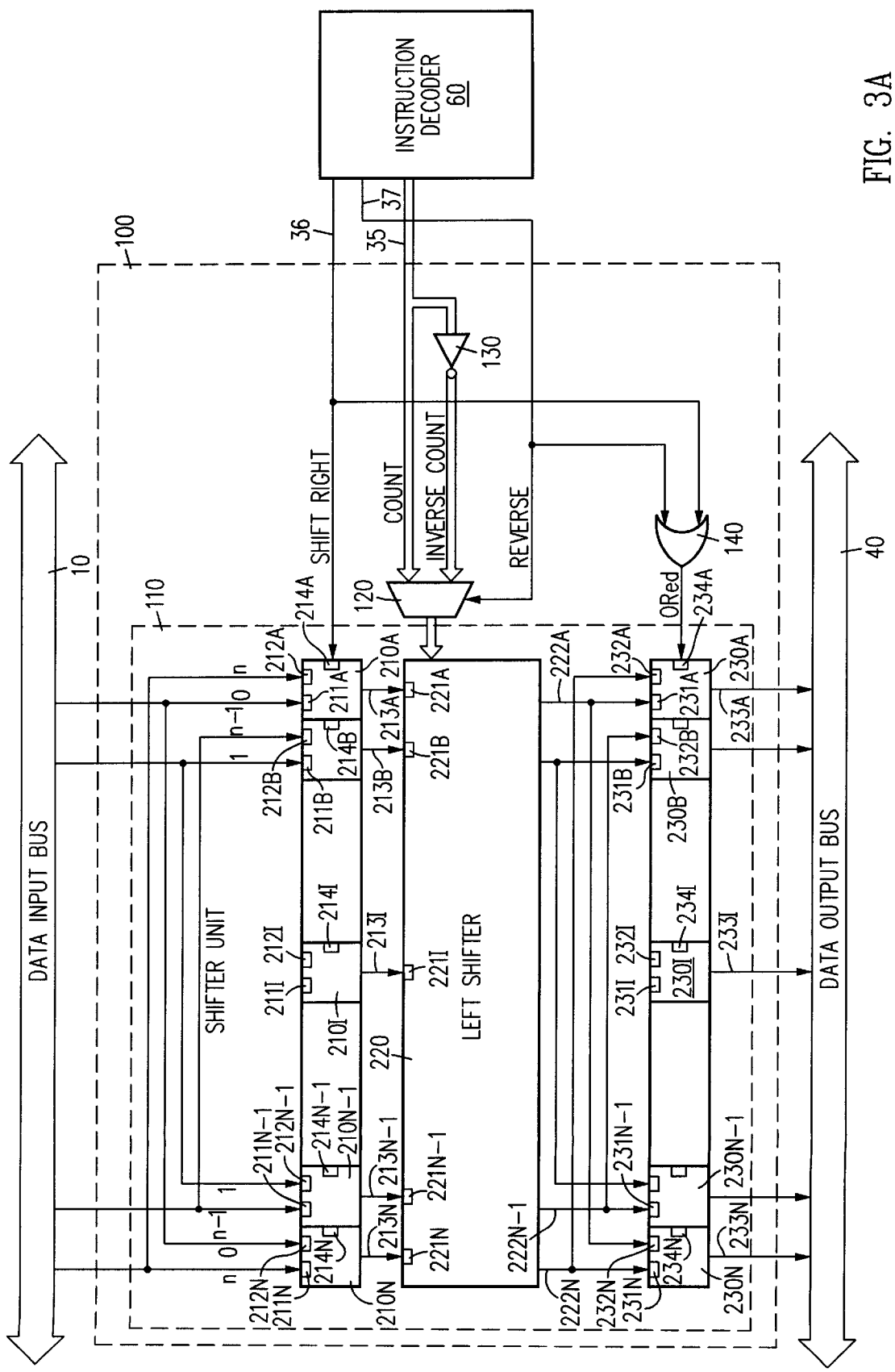
FIG. 3A illustrates, in a low level block diagram, use of a left shifter, to implement the bit reversal instruction as illustrated in FIG. 2.
Figure 3B:
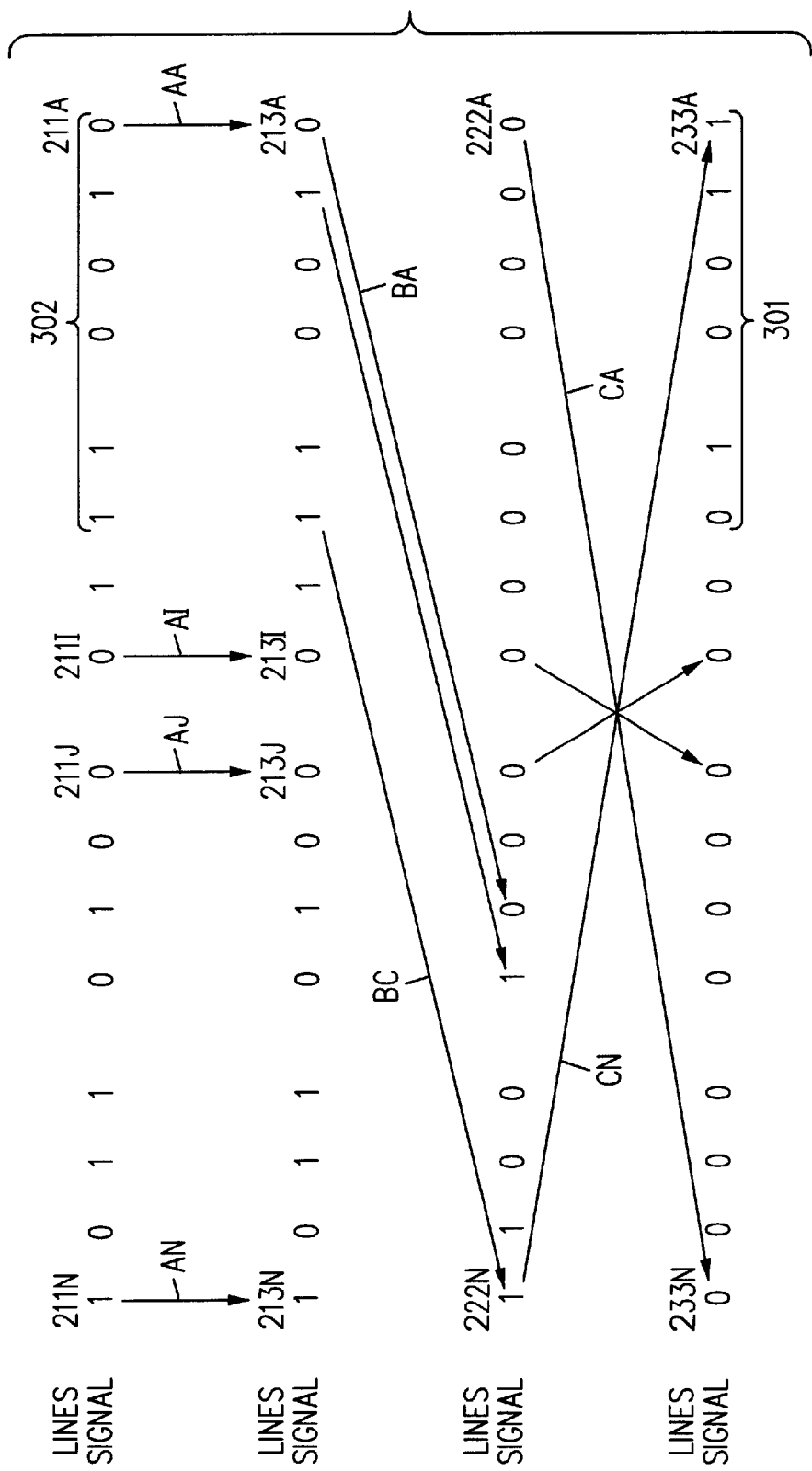
FIG. 3B illustrates the signals on various lines of the shifter unit of FIG. 3A.
Figure 4:
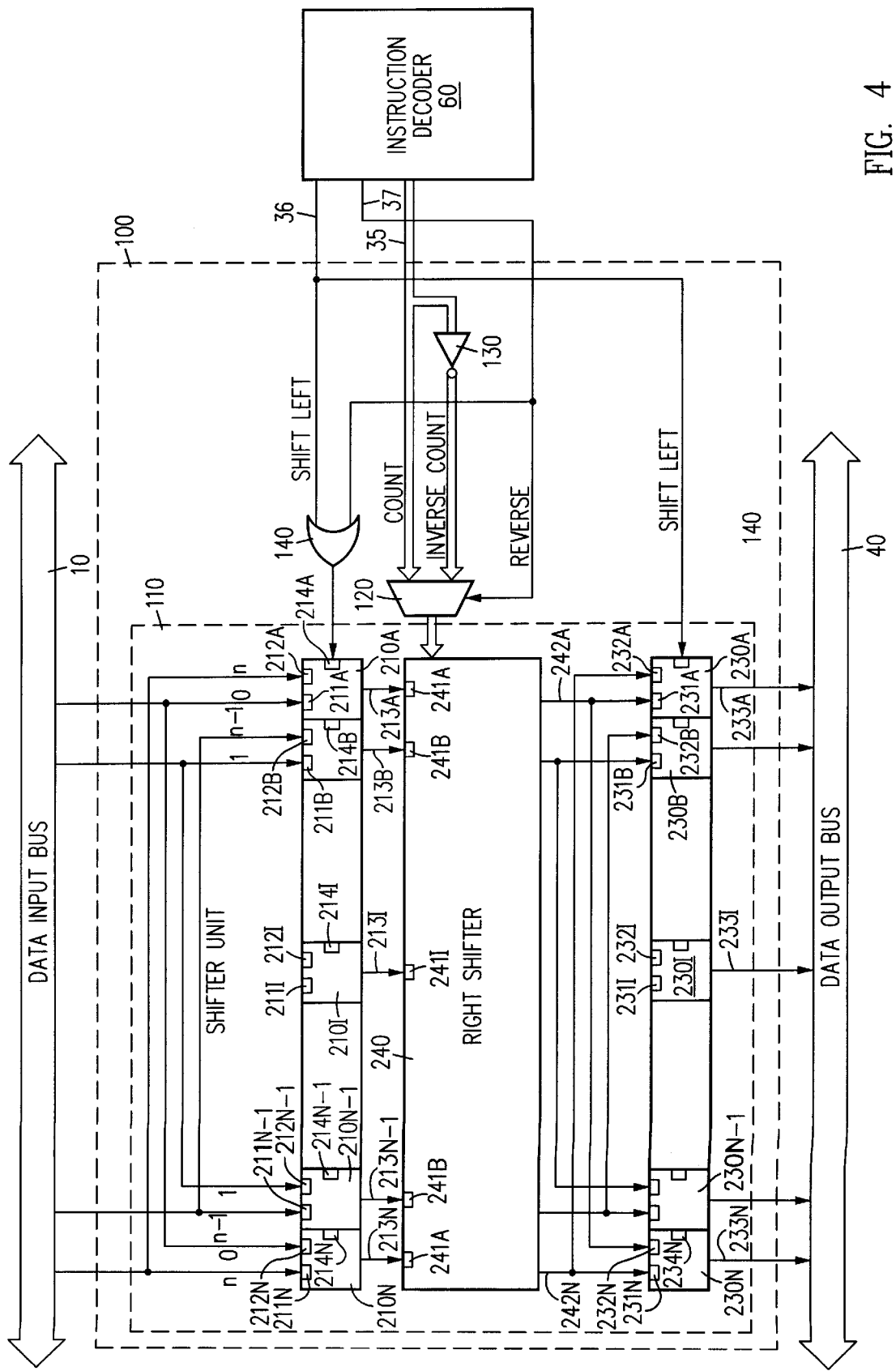
FIG. 4 illustrates, in a low level block diagram, use of a right shifter in an embodiment similar to the embodiment of FIG. 3A.

```
/*************************************************************/
Copyright 1997 ZSP Corporation.
/*************************************************************/
/********* Top level module ************/
module     shifter_revb (
                    data_out, /*see data output bus 40 in FIG. 3A*/
                    data_in, /*see data input bus 10 in FIG. 3A*/
                    count, /*see count bus 35 in FIG. 3A*/
                    right_shift_operation, /*see line 36 in FIG. 3A*/
                    revb_operation /*see line 37 in FIG. 3A*/
                    );
    output [15:0]   data_out;
    input [15:0]    data_in;
    input [3:0]     count;
    input           right_shift_operation;
    input           revb_operation;
/*************************************************
If revb operation, logically invert shift_count.
*************************************************/
    wire [3:0] shift_count;
    assign shift_count = revb_operation? (~count[3:0]:count[3:0];
/*above statement implements multiplexers 120 and inverters 130
in FIG. 3A*/
/*************************************************
    shift_right_OR_revb = logical OR of right_shift_operation,
                   revb_operation signals
    (see gate 140 in FIG. 3A)
*************************************************/
    wire  shift_right_OR_revb;
    assign shift_right_OR_revb =
right_shift_operation | revb_operation;
/*************************************************
    Instantiate actual 16 bit shifter
    (See shifter unit 110 in FIG. 3A)
*************************************************/
    shifter_16bit   shifter_unit
                    (
                    .out        (data_out),
                    .in         (data_in),
                    .shft_count (shift_count),
```

APPENDIX A
-continued

```
                    .swap1_en   (right_shift_operation),
                    .swap2_en   (shift_right_OR_revb)
                    );
endmodule
module shifter_16bit    (
                    out,
                    in,
                    shft_count,
                    swap1_en,
                    /*see terminal 214A-214N in FIG. 3A*/
                    swap2_en
                    /*see terminal 234A-234N in FIG. 3A*/
                    );
/*************************************************************
swap1_en is control signal for input multiplexers 210A-210N
swap2_en is control signal for output multiplexers 230A-230N
*************************************************************/
output[15:0]    out;
input[15:0]     in;
input[3:0]      shft_count;
input           swap1_en;
input           swap2_en;
wire[15:0]stage1_output;
wire[15:0]stage2_output;
swap_16bit  input_stage
                    (
                            .out    (stage1_output),
                            .in     (in),
                            .swap_en (swap1_en)
                    );
/*above statement implements input multiplexers 210A-210N
of FIG. 3A*/
    assign stage2_output = stage1_output <<shft_count;
/*above statement implements left shifter 220 of FIG. 3A*/
swap_16bit  output_stage
                    (
                            .out    (out),
                            .in     (stage2_output),
                            .swap_en (swap2_en)
                    );
/*above statement implements output multiplexers 230A-230N
of FIG. 3A*/
endmodule
module swap_16bit (
                    out,
                    in,
                    swap_en
                    );
                    output [15:0]out;
                    input [15:O]in;
                    input swap_en;
                    assign out[15]= swap_en? in[0]:in[15];
                    assign out[14]= swap_en? in[1]:in[14];
                    assign out[13]= swap_en? in[2]:in[13];
                    assign out[12]= swap_en? in[3]:in[12];
                    assign out[11]= swap_en? in[4]:in[11];
                    assign out[10]= swap_en? in[5]:in[10];
                    assign out[9]= swap_en? in[6]:in[9];
                    assign out[8]= swap_en? in[7]:in[8];
                    assign out[7]= swap_en? in[8]:in[7];
                    assign out[6]= swap_en? in[9]:in[6];
                    assign out[5]= swap_en? in[10]:in[5];
                    assign out[4]= swap_en? in[11]:in[4];
                    assign out[3]= swap_en? in[12]:in[3];
                    assign out[2]= swap_en? in[13]:in[2];
                    assign out[1]= swap_en? in[14]:in[1];
                    assign out[0]= swap_en? in[15]:in[0];
                    endmodule
```

I claim:

1. An apparatus coupled to a data input bus, a data output bus, a count bus, and a plurality of instruction lines, said data input bus carrying an input signal having a plurality of bits, said apparatus comprising:

a plurality of inverters coupled to said count bus;

a plurality of multiplexers coupled to said count bus and to said plurality of inverters, thereby to receive a count signal from said count bus and an inverted count signal from said plurality of inverters, each multiplexer having a multiplexer control terminal coupled to a first instruction line in said plurality of instruction lines; and a shifter unit coupled to said multiplexers, said shifter unit shifting bits in said input signal by a number indicated by said multiplexers, wherein said shifter unit comprises:
 a left shifter that shifts said bits left by said number;
 a logic gate having input terminals coupled to said instruction lines;
 a plurality of output multiplexers, each output multiplexer having a first data terminal, a second data terminal, a data output line, and an output control terminal, each data output line being coupled to said data output bus, each output control terminal being coupled to receive a control signal from said logic gate, said first data terminal of each output multiplexer being coupled to said left shifter, and said second data terminal of each output multiplexer being coupled to a first data terminal of another output multiplexer in said plurality of output multiplexers; wherein:
  each output multiplexer couples said second data terminal to said data output bus in response to an active signal on said output control terminal thereby to pass to said data output bus a first output signal, said first output signal having said number of bits reversed with respect to corresponding bits in said input signal; and
  each output multiplexer couples said first data terminal to said data output bus in response to an inactive signal on said output control terminal thereby to pass to said data output bus a second output signal, said second output signal having bits shifted left by said number with respect to corresponding bits in said input signal.

2. The apparatus of claim 1, wherein:
when each first data terminal of each output multiplexer is identified by a number between 0 and n and each second data terminal of each output multiplexer is identified by a number between 0 and n, a second data terminal identified by a number i is coupled to a first data terminal identified by another number n-i, where $0 \leq i \leq n$.

3. The apparatus of claim 2 further comprising:
a plurality of input multiplexers, each input multiplexer having a third data terminal, a fourth data terminal, a data input line, and an input control terminal, each data input line being coupled to said left shifter, each input control terminal being coupled to said first instruction line; wherein:
 when each third data terminal of said input multiplexer is identified by a number between 0 and n, and each fourth data terminal of said input multiplexer is also identified by a number between 0 and n, each fourth data terminal identified by a number i is coupled to a third data terminal identified by another number n-i,
where $0 \leq i \leq n$;
 each input multiplexer couples said fourth data terminal to said data input line in response to an active signal on said input control terminal so that said output signal has bits shifted right by said number with respect to corresponding bits in said input signal; and
 each input multiplexer couples said third data terminal to said data input line in response to an inactive signal on said input control terminal so that said output signal has bits shifted left by said number with respect to corresponding bits in said input signal.

4. An apparatus coupled to a data input bus, a data output bus, a count bus, and a plurality of instruction lines, said data input bus carrying an input signal having a plurality of bits, said apparatus comprising:
a plurality of inverters coupled to said count bus;
a plurality of multiplexers coupled to said count bus and to said plurality of inverters, thereby to receive a count signal from said count bus and an inverted count signal from said plurality of inverters, each multiplexer having a multiplexer control terminal coupled to a first instruction line in said plurality of instruction lines; and
a shifter unit coupled to said multiplexers, said shifter unit shifting bits in said input signal by a number indicated by said multiplexers, wherein said shifter unit comprises:
 a right shifter that shifts said bits right by said number;
 a logic gate having input terminals coupled to said instruction lines;
 a plurality of input multiplexers, each input multiplexer having a third data terminal, a fourth data terminal, a data input line, and an input control terminal, each data input line being coupled to said right shifter, each input control terminal being coupled to receive a control signal from said logic gate, said third data terminal of each input multiplexer being coupled to said data input bus, and said fourth data terminal of each input multiplexer being coupled to a third data terminal of another input multiplexer in said plurality of input multiplexers; wherein:
  each input multiplexer couples said fourth data terminal to said right shifter in response to an active signal on said input control terminal thereby to pass to said data input bus a first input signal, said first input signal having said number of bits reversed with respect to corresponding bits in said input signal; and
  each input multiplexer couples said third data terminal to said data input bus in response to an inactive signal on said input control terminal thereby to pass to said data input bus a second input signal, said second input signal having bits identical to corresponding bits in said input signal.

5. A method for manipulating a plurality of bits of an input signal, said method comprising:
reversing the order of said plurality of bits using a shifter unit, shifting said plurality of bits left using said shifter unit;
shifting said plurality of bits right using said shifter unit; wherein:
 said reversing includes: driving a first signal active to said shifter unit and driving a signal inverse of the number of bits to be reversed to said shifter unit; and
 said shifting plurality of bits left includes: driving a second signal active to said shifter unit and driving a signal indicative of the number of bits to be shifted to said shifter unit.

6. The method of claim 5, further comprising:
logically combining said first signal and said second signal to generate an ORed signal; and
passing said ORed signal to said shifter unit.

7. The method of claim 6, wherein said shifter unit includes a plurality of input multiplexers, a plurality of output multiplexers and a left shifter coupled between said plurality of input multiplexers and said plurality of output multiplexers, said method further comprising:

passing said ORed signal to each multiplexer in said plurality of output multiplexers; and passing said second signal to each multiplexer in said plurality of input multiplexers.

8. The method of claim 5 further comprising:

inverting a signal indicative of the number of bits to be manipulated.

* * * * *